United States Patent
Zanzucchi et al.

(10) Patent No.: US 7,714,888 B2
(45) Date of Patent: May 11, 2010

(54) REFLECTION SPECTROSCOPIC MEANS FOR DETECTING PATTERNED OBJECTS

(75) Inventors: Peter John Zanzucchi, Mercer, NJ (US); Herschel Clement Burstyn, Mercer, NJ (US)

(73) Assignee: Blue Marlin LLC, New York, NY (US)

( * ) Notice: Subject to any disclaimer, the term of this patent is extended or adjusted under 35 U.S.C. 154(b) by 1046 days.

(21) Appl. No.: 11/072,252

(22) Filed: Mar. 7, 2005

(65) Prior Publication Data
US 2006/0197829 A1    Sep. 7, 2006

(51) Int. Cl.
*H04N 7/18* (2006.01)
(52) U.S. Cl. ...................................... 348/157
(58) Field of Classification Search ........................ None
See application file for complete search history.

(56) References Cited

U.S. PATENT DOCUMENTS

| | | | |
|---|---|---|---|
| 3,944,738 A | | 3/1976 | Johnson |
| 4,978,224 A | * | 12/1990 | Kishimoto et al. .......... 356/394 |
| 6,469,706 B1 | * | 10/2002 | Syeda-Mahmood ......... 345/589 |
| 6,520,864 B1 | * | 2/2003 | Wilk .......................... 473/152 |
| 6,561,917 B2 | * | 5/2003 | Manwaring ................. 473/151 |
| 6,631,987 B2 | * | 10/2003 | Reichow et al. ............. 351/163 |
| 6,707,487 B1 | * | 3/2004 | Aman et al. ................. 348/169 |
| 6,902,284 B2 | * | 6/2005 | Hutzel et al. ................ 359/865 |
| 7,376,245 B2 | * | 5/2008 | Morozumi et al. .......... 382/103 |
| 2005/0282645 A1 | * | 12/2005 | Bissonnette et al. ......... 473/131 |

OTHER PUBLICATIONS

Foy B.R., McVey B.D., Petrin R.R., Tiee J.J., and Wilson C.W., "Remote mapping of vegetation and geological features by Lidar in the 9-11 micron Region", App. Opt. 40 (2001), 4344-4352.
Pont S.C. and Koenderink J.J., "Bidirectional reflectance distribution function of specular surfaces with hemispherical pits", J. Optical Soc. Am. 19 (2002), 2456-2466.

* cited by examiner

*Primary Examiner*—Nhon T Diep
(74) *Attorney, Agent, or Firm*—The Marbury Law Group PLLC

(57) ABSTRACT

A device detects the location of patterned objects in an environment by receiving an optical image and converting the optical image of the lost object into a color digital image. The device employs software to perform an analysis of the color digital image to detect the location of the one or more patterned objects in the environment by using color characteristics of light reflected from a pattern on the one or more patterned objects. The software uses a range of the visible portion of the color space uniquely identified for the light reflected from the pattern on the object and identifies those pixels in the digital image that may be possible targets.

19 Claims, 3 Drawing Sheets

REFLECTION SPECTROSCOPIC MEANS FOR DETECTING PATTERNED OBJECTS

BACKGROUND OF THE INVENTION

1. Field of the Invention

The present invention relates to a device, system and computer program product for detecting a patterned object. More particularly, the present invention relates to a method, device and computer program product for detecting the location of a patterned object in a landscape using Reflection Spectroscopy.

2. Description of the Prior Art

There are many circumstances where an object is lost in landscape and determining its location in the landscape is difficult due to the complexity of the landscape. One such circumstance occurs while playing the sport of golf. Typically, the sport of golf is played on landscape having a variety of characteristics, such as grass, sand, trees, water, etc. It is not uncommon for a golf ball to become lost while playing golf due to these characteristics. Once a golf ball is lost a substantial amount of time can be spent trying to find it. Attempting to find a lost golf ball results in an increase of playing time for the golfer who lost the ball, as well as other golfers playing behind or with the golfer that lost the ball. In cases where the golf ball cannot be located, the golfer who lost the ball is accessed a penalty stroke thereby increasing that golfer's final score.

Accordingly, there is a need for a device, method and computer program product for detecting the location of a patterned object in landscape having a variety of characteristics. There is a need for a device, method and computer program product for detecting the location of a patterned object using reflection spectroscopy. There is further need for a device, method and computer program product for detecting the reflection of laser light from a pattern on a patterned object with a mobile device. There is further need for a device, method and computer program product for detecting the location of a patterned object, where the pattern on the object is standard to the object. There is a need for a device, method and computer program product for detecting the location of a patterned object in a reduced amount of time.

SUMMARY OF THE INVENTION

According to embodiments of the present invention, device, method and computer program product for detecting the location of a patterned object in landscape having a variety of characteristics are provided. The method projects laser light a wavelength detectable by a sensor onto a landscape having an object configured with a pattern that is standard to the object, such as a dimple on a golf ball. An optical image of the landscape including a reflection from the pattern on the object is received and converted into a color digital image consisting of charged signals, where each charged signal was generated by a pixel in an array of a Charged Coupler Device (CCD) by photoelectric conversion. The color digital image depicts the patterned object in the landscape as a bright illumination due to the reflection of the laser light from the pattern, such as a golf ball dimple, on the patterned object. The concave pattern characteristic of golf balls creates a unique reflection of light that can be identified. Software performs an analysis of the color digital image to detect this unique reflection of laser light and facilitate the identification of objects with this characteristic, such as golf balls.

BRIEF DESCRIPTION OF THE DRAWINGS

The above described features and advantages of the present invention will be more fully appreciated with reference to the detailed description and appended figures in which.

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

According to embodiments of the present invention, device, method and computer program product for detecting the location of a patterned object in landscape having a variety of characteristics are provided. The method projects near infrared laser light onto a landscape having an object with a pattern that is standard to the object, such as a golf ball. Although any radiation of light consistent with the size of the pattern on an object can be used, the use of near infrared light offers advantages including, but not limited to, safety, manufacturing and detection. An optical image of the landscape including a reflection from a pattern configured on the patterned object is received and converted into a color digital image consisting of charged signals, where each charged signal was generated by a pixel in an array of a Charged Coupler Device (CCD) by photoelectric conversion.

The color digital image depicts the patterned object in a landscape as a bright illumination due to the reflection of the laser light from the pattern, such as a golf ball dimple, on the patterned object. Software performs an analysis of the color digital image to detect the reflected laser light from the pattern on the patterned object.

Figure 1:
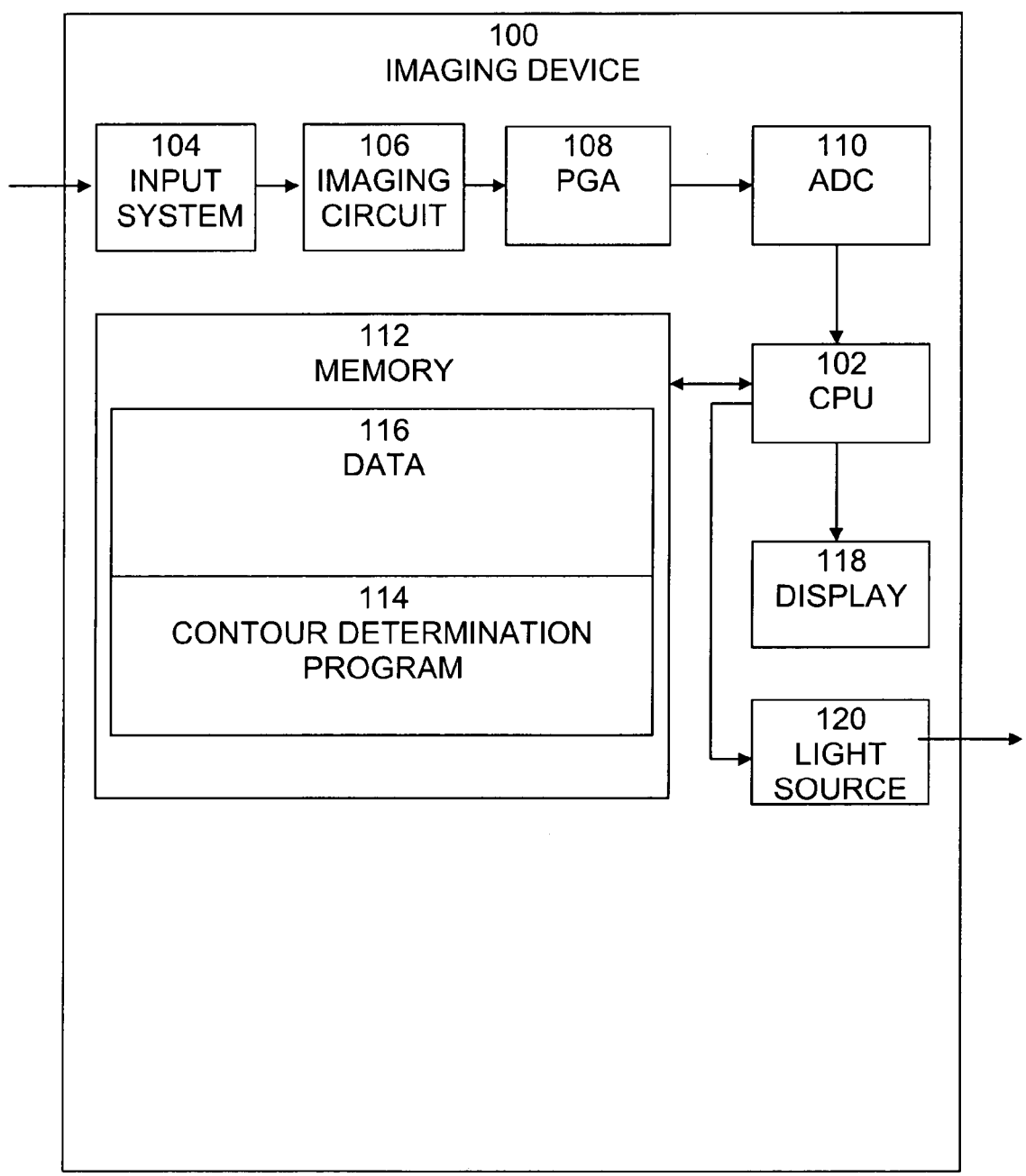
FIG. 1 depicts an exemplary functional block diagram of a device in which the present invention can find application.

FIG. 1 depicts a functional block diagram of an image taking device in which the present invention can find application. In the embodiment of FIG. 1, image taking device 100 can be implemented to detect the location of a patterned object in a landscape based on the reflection of laser light from the pattern on the patterned object. In the FIG. 1 embodiment, image taking device 100 is a system, such as a digital camera, charge couple device (CCD) imager, complementary metal oxide semiconductor (CMOS) imager or the like, but can be any apparatus that executes program instruction in accordance with the present invention. In an embodiment of the present invention, the image taking device 100 is handheld. In an embodiment of the present invention, the image taking device 100 may be mounted on a mobile object., such as a golf cart.

In the FIG. 1. embodiment of the present invention, the image taking device 100 includes a processor (CPU) 102, an input system 104, imaging circuitry 106, programmable gain amplifier (PGA) 108, analog-to-digital converter 110, memory 112, data 116, display 118, and illumination source 120. In the FIG. 1 embodiment, the input system 104 is a digital imaging system. The input system 104 provides an interface for acquiring landscape light, light depicting a landscape, light reflected from a landscape and forming an image of the landscape, light depicting the object, or light reflected from a pattern on an object in the landscape. The input system 104 includes imaging optics and a charge-coupled device sensor having a plurality of pixels.

In the FIG. 1 embodiment of the present invention, the illumination source 120 generates light that is projected onto a landscape having an object therein. The light is selected from coherent or incoherent sources including, but not limited to, an LED and a laser. In an embodiment of the present invention, the illumination source 120 can be an infrared LED diode lamp. In an embodiment of the present invention, the infrared LED diode lamp operates at a near infrared, but can operate at any wavelength where charge-coupled device sensor can identify the light, but the light cannot be seen by the human eye. In an embodiment of the present invention, the LED diode lamp operates at a wavelength of approximately 780 nm.

In an embodiment of the present invention, the illumination source 120 generates light for projection onto the landscape. In an embodiment of the present invention, the illumination source 120 projects the light from different perspective views. The projection of light from different perspective views can be performed using a lens that projects the pattern at different angles. In the FIG. 1 embodiment of the present invention, the illumination source 120 is included in the image taking device 100. In an embodiment of the present invention, the illumination source 120 is separate from the image taking device 100.

In the FIG. 1 embodiment of the present invention, the image taking device 100 projects the light at an angle. In an embodiment of the present invention, the light can return at a variety of angles depending on the position of the pattern in relation to the angle the light was projected onto the patterned object.

The input system 104 is coupled to circuitry 106 and provides an analog image signal to the circuitry 106. The circuitry 106 samples the analog image signal and extracts the voltage that is proportional to the amount of light which fell on each pixel of the charge-coupled device sensor of the input system 104. In embodiment of the present invention color components R (red), G (green) and B (blue) are used. Programmable gain amplifier (PGA) 108 is coupled to circuitry 106, amplifies the voltages proper range and provides the voltages as input to analog-to-digital converter 110. In an embodiment, the input system 104 is coupled to circuitry 106 and provides a suitable digital signal to CPU 102.

Analog-to-digital converter (ADC) 110 is coupled to CPU 102 and converts the voltage to a digital code suitable for further digital signal processing by CPU 102. The CPU 102 is a microprocessor, such as an INTEL PENTIUM® or AMD® processor, but can be any processor that executes program instructions in order to carry out the functions of the present invention. The CPU 102 executes software that performs an analysis of the color digital image to detect the location of the one or more objects in the environment by using color characteristics of the light reflected from the pattern on the one or more patterned objects. The software uniquely identifies the light reflected from the pattern on the object. For example, the software uniquely identifies the light reflected from the pattern on the patterned object by the scatter in the image due to the particular wavelength of laser light used. The software uses a range of the visible portion of the color space uniquely identified for the light reflected from the pattern on the object.

The range of the color space is based at least in part on the color spaces identified for the light reflected from the pattern on the object. The analysis includes comparing the color space of each pixel in the color digital image with each of the color spaces in the range of color spaces identified for the particular wavelength of laser light projected onto the landscape to determine if there is a match. Once a match is determined the location of that pixel is recorded. Recorded pixels are analyzed to determine whether there are clusters of pixels. If pixel clusters are identified, the cluster of pixels is compared to characteristic of light reflected from the patterned object, such as bidirectional reflection.

In the FIG. 1 embodiment, the memory 112 is coupled to CPU 102 and stores object detection program 114 and data 116. The data 116 includes, but is not limited to, color digital images depicting the landscape and the reflected light from one or more patterned objects, a set of color space ranges, where each color space range in the set of color space ranges uniquely identifies the light reflected from the pattern on the object, and the color space of one or more pixels of the color digital images.

In the FIG. 1 embodiment, the object detecting program 114 provides the functionality associated with detecting the location of a patterned object in a particular landscape as executed by the CPU 102. The object detecting program 114 is designed to report detection of an object's location in the color digital image, such as on a display 118.

Figure 2:
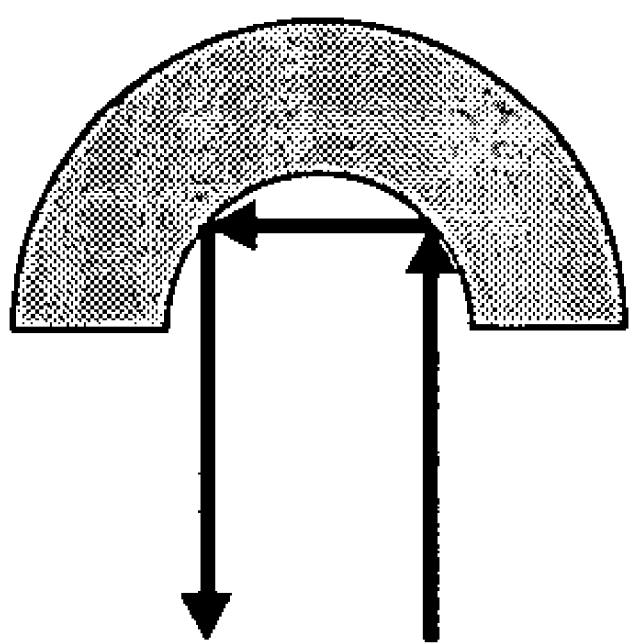
FIG. 2 depicts an exemplary diagram of reflection from a dimple on a golf ball.

An exemplary diagram of an ideal reflection from a dimple of a golf ball is shown in FIG. 2. In the FIG. 2 embodiment of the present invention, the reflection is depicted as a retroreflection, where the beam is reflected off two interior surfaces of a cavity and returned to the source displaced by the width of the cavity. The image taking device 100 can detect unusual reflection, such as a "bright spots," due to the pattern of the object.

Figure 3:
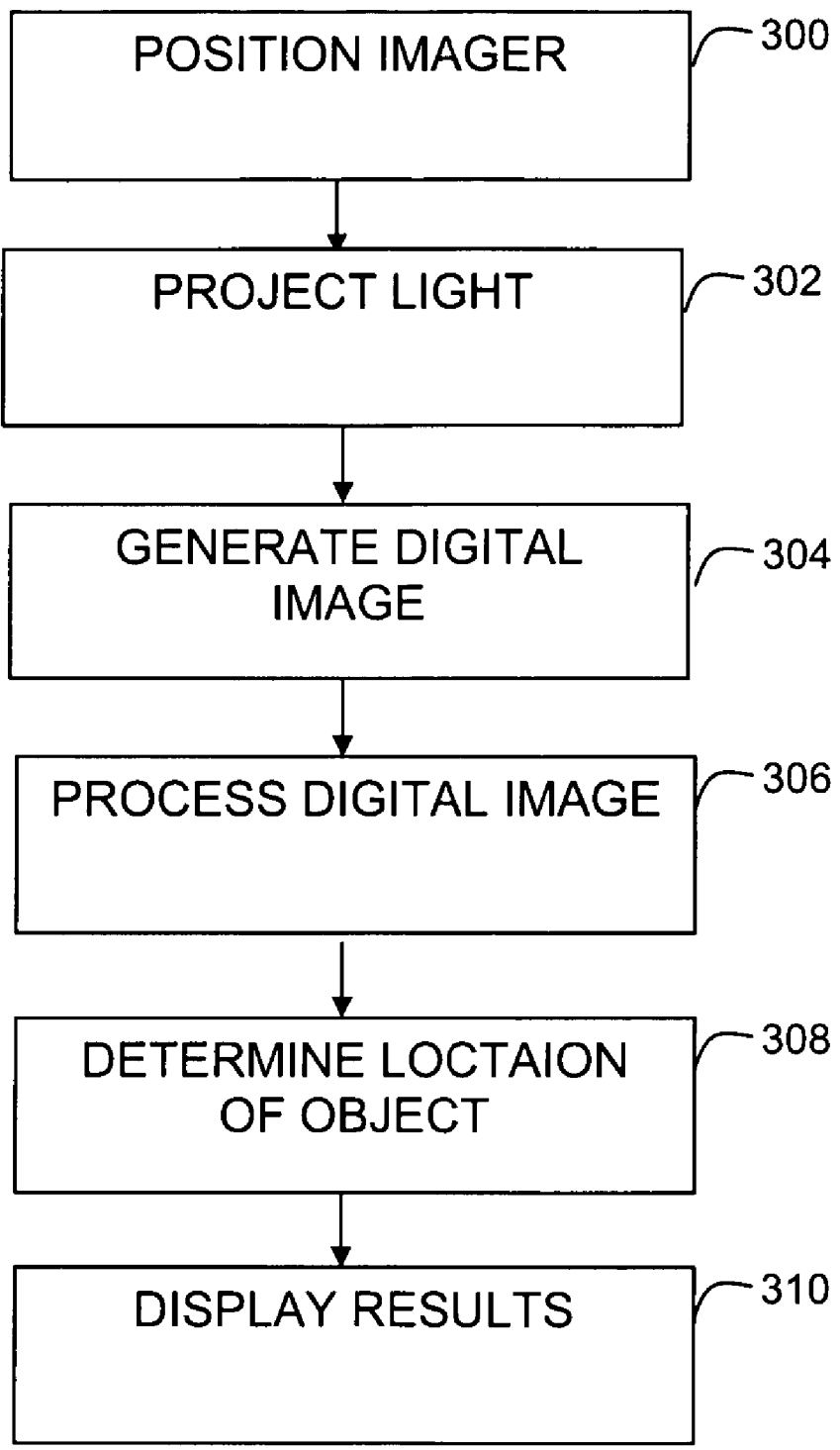
FIG. 3 depicts an exemplary flow diagram for detecting the location of an object having a concave pattern configured thereon according to an embodiment of the present invention.

An exemplary flow diagram of an embodiment for detecting the location of a patterned object in a landscape is shown in FIG. 3. FIG. 3 is best understood when read in combination with FIG. 1. As shown in FIG. 3, the process begins with step 300, in which the device is positioned where an image of the landscape is desired to taken. In an embodiment of the present invention, the landscape includes the area where a golf ball has been hit. The device can be positioned approximately 4 to 5 feet above the landscape and a distance of approximate 40 to 50 feet from the landscape. In an embodiment of the present invention, the device is positioned normal to the landscape. In an embodiment of the present invention, the device is handheld with an angle to the landscape that is compensated and known by sensing elements of the light source 120.

In step 302, a light from a light source is projected onto the landscape. In an embodiment of the present invention, the light is generated using one of a line image and a raster scan pattern across the landscape. Changes in the line image are evaluated to identify the presence of the patterned object.

In step 304, a digital image of the landscape having the light projected thereon is generated. This includes, but is not limited to, acquiring landscape light or light depicting a landscape and forming an image, providing an analog image signal for extraction of voltage which is proportional to the amount of light which fell on each pixel of a charge-coupled device sensor and converting the voltage to a digital code suitable for further digital signal processing. In an embodiment of the present invention, the color components Red (R), Green (G), and Blue (B) are used. In an embodiment of the present invention, multiple digital images of the landscape having the line image or raster scan pattern projected thereon are generated.

In step 306, the digital color image is processed to detect the reflection of the light from the pattern on the object grip pattern in the digital image of the landscape. This includes, but is not limited to, comparing the color space of each pixel in the color digital image with the color space of the light source defined for the line image or raster scan pattern and storing the location of the pixels whose color space matches the color space of the light source defined for the line image or raster scan pattern.

In step 308, a decision statistic is defined that represents the likely characteristics of the type of object.

In step 310, it is determined whether the object is identified in the environment based on one or more statistics. A statistic includes color space information based on the wavelength of the light source, and may also include intensity information and/or cluster information. A statistic may also include weighting values from any reference images collected. The preferred approach is to define one statistic, but it is obvious that multiple statistics could be defined and used with this method. In step 312, the object is reported if identified, such as by display 118.

While specific embodiments of the present invention have been illustrated and described, it will be understood by those having ordinary skill in the art that changes can be made to those embodiments without departing from the spirit and scope of the invention.

What we claim is:

1. A method of detecting the location of a patterned object in a landscape, the method comprising:
   storing a target color space range based on a color space of light from a light source having a wavelength that is reflected from patterns in the patterned object;
   projecting light of the wavelength from the light source onto the patterned object;
   generating a color digital image of an environment;
   determining whether there are a set of pixels in the color digital image of the environment that are within the target color space range by
      comparing a color space of pixels in the color digital image with the target color space range, and
      storing locations of pixels whose color space matches the target color space range; and
   reporting the determination that there are a set of pixels within the target color space range.

2. The method according to claim 1, wherein the color digital image is generated by one of: a digital camera and a digital video camera.

3. The method according to claim 2, wherein the light source is a laser.

4. The method according to claim 3, further comprising reflecting the projected light from the patterns configured on the patterned object, wherein the wavelength of the light source is of a range for which RGB components may be determined.

5. The method according to claim 4, wherein the patterned object is a golf ball.

6. The method according to claim 5, wherein the landscape includes at least one of: grass, bushes, trees, and sand.

7. The method according to claim 3, wherein the wavelength of the laser is near infrared.

8. The method according to claim 3, wherein the laser projects light by projecting a line image or raster scan.

9. The method according to claim 1, wherein the color digital image is one color digital image in a series of color digital images.

10. The method of claim 1, wherein the determination that there are a set of pixels within the target color space range is reported by one of: a visual display, a tactile alert, and a sound alert.

11. A system for detecting the location of a patterned object in a landscape, comprising:
    a light source having a wavelength;
    memory having stored therein a target color space range based on a color space of light from the light source that is reflected from patterns in the patterned object;
    a sub-system operable to generate a color digital image of an environment;
    a processor operable to determine whether there are a set of pixels in the color digital image of the environment that are within the target color space range by
       comparing a color space of each pixel in the color digital image with the target color space range, and
       storing locations of pixels whose color space matches the target color space range; and
    output circuitry operable to report the determination that there are a set of pixels within the target color space range.

12. The system according to claim 11, wherein the sub-system operable to generate a color digital image of an environment is one of: a digital camera and a digital video camera.

13. The system according to claim 12, wherein the light source is a laser.

14. The system according to claim 13, further comprising a sensor operable to detect the projected light reflected from the patterns configured on the patterned object, wherein the wavelength of the light source is of a range for which RGB components may be determined.

15. The system according to claim 14, wherein the patterned object is a golf ball.

16. The system according to claim 15, wherein the landscape includes at least one of: grass, bushes, trees, and sand.

17. The method according to claim 13, wherein the wavelength of the laser is near infrared.

18. The system according to claim 11, wherein the color digital image is one color digital image in a series of color digital images.

19. The system according to claim 11, wherein the determination that there are a set of pixels within the target color space defined for projected light is reported by one of: a visual display, a tactile alert, and a sound alert.

* * * * *